(12) United States Patent
Graves et al.

(10) Patent No.: US 8,956,020 B2
(45) Date of Patent: Feb. 17, 2015

(54) AUXILIARY LAMP MOUNTING ADAPTER ASSEMBLY FOR AUTOMOTIVE VEHICLES

(71) Applicant: Ford Global Technologies, LLC, Dearborn, MI (US)

(72) Inventors: Greg Graves, Milford, MI (US); Kent Bock, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 13/846,994

(22) Filed: Mar. 19, 2013

(65) Prior Publication Data

US 2014/0287600 A1    Sep. 25, 2014

(51) Int. Cl.
*B60Q 1/00*   (2006.01)
*B60Q 1/26*   (2006.01)
*B60Q 1/44*   (2006.01)

(52) U.S. Cl.
CPC ... *B60Q 1/26* (2013.01); *B60Q 1/44* (2013.01)
USPC .............................. 362/459; 362/549; 439/36

(58) Field of Classification Search
CPC ....................................................... B60Q 1/2619
USPC .............................. 362/459, 548, 549; 439/36
See application file for complete search history.

(56) References Cited

U.S. PATENT DOCUMENTS

| | | | |
|---|---|---|---|
| 5,103,382 A * | 4/1992 | Kondo et al. | 362/503 |
| 7,905,639 B2 * | 3/2011 | Luo et al. | 362/487 |
| 8,104,941 B2 * | 1/2012 | Kolstee et al. | 362/549 |
| 8,740,628 B2 * | 6/2014 | Brooks et al. | 439/35 |
| 2013/0141926 A1 * | 6/2013 | McDermott | 362/485 |

* cited by examiner

*Primary Examiner* — Evan Dzierzynski
(74) *Attorney, Agent, or Firm* — Joseph E. Root

(57) ABSTRACT

An auxiliary lighting adapter housing for mounting one or more auxiliary lamps adjacent to a primary lamp mounted onto a lamp aperture provided within a portion of a vehicle. The adapter housing includes an adapter aperture, sized and positioned to align and communicate with the lamp aperture. One or more auxiliary mounts of the adapter housing are adapted to receive and accommodate auxiliary lamps. The housing includes multiple passages, and each passage connects a specific auxiliary mount to the adapter aperture.

16 Claims, 3 Drawing Sheets

AUXILIARY LAMP MOUNTING ADAPTER ASSEMBLY FOR AUTOMOTIVE VEHICLES

TECHNICAL FIELD

The present disclosure generally relates to automotive vehicles, and, more specifically, to assemblies for mounting auxiliary lightings in automotive vehicles, by utilizing pre-existing lighting mounting provisions within automotive vehicles.

BACKGROUND

Center Height Mounted Stop Lamps (CHMSL) have been have been standard equipment on all new passenger cars sold in the United States since model year 1996, As required by US Federal Law. The same requirement has applied to light trucks since model year 1994. Consisting of a light mounted above, or just inside, the back glass the CHMSL is designed to provide unambiguous warning that the vehicle is slowing down or stopping, from a source above the level of the vehicle's taillights.

Passenger vehicles often have a CHMSL located inside the vehicle's rear glass, but light truck designs generally locate the CHMSL above the rear glass, mounted in an aperture extending through the truck body sheet metal. Truck owners, however, made desire to add auxiliary lighting to the CHMSL to provide, for example, additional turn indicator lights. Conventionally, that process requires additional holes to be formed in the vehicle sheet metal, an operation that not only damages the vehicle body but creates an entry point for water intrusion. That damage may also negatively impact the resale price of the vehicle.

Therefore, a need exists for an assembly for mounting auxiliary lighting on a vehicle such as a light truck, without requiring additional holes in the vehicle body. Such an assembly would maintain the integrity of the vehicle body as well as ensuring that the potential for water penetration was minimized.

SUMMARY

The present disclosure provides an adapter assembly for mounting auxiliary lighting onto a portion of an automotive vehicle, which avoids the need to drill holes into the vehicle's sheet metal surface. The adapter assembly is incorporated into pre-existing lamp mounting provisions provided within the vehicle, and is used for mounting auxiliary lamps proximal to an originally mounted primary lamp of the vehicle. Further, the assembly substantially minimizes installation damage to the vehicle during the process of adding the auxiliary lighting.

According to an aspect, the present disclosure provides an auxiliary lighting adapter assembly for mounting one or more auxiliary lamps adjacent a primary lamp on a vehicle. A portion of the vehicle's body has a lamp aperture formed within it, for receiving the primary lamp. The adapter assembly includes an adapter housing mounted on the vehicle body. The adapter housing has an adapter aperture, which is sized and positioned to align with the lamp aperture. Multiple auxiliary mounts are provided within the adapter housing, and each auxiliary mount receives and accommodates an auxiliary lamp. The adapter housing further includes one or more electrical connectors. Each electrical connector extends through the adapter aperture to an auxiliary mount, and electrically couples the auxiliary lamp accommodated within that auxiliary mount to a power source within the vehicle. A sealing device is positioned between the adapter housing and the vehicle body, which completely surrounds the lamp aperture and the adapter aperture.

According to another aspect, the disclosure provides an auxiliary lighting adapter for mounting one or more auxiliary lamps adjacent to a primary lamp mounted onto a lamp aperture provided within a portion of a vehicle. The adapter includes an adapter aperture, which is sized and positioned to align and communicate with the lamp aperture. One or more auxiliary mounts are provided within the adapter, and each auxiliary mount receives and accommodates an auxiliary lamp. The adapter also includes multiple passages, and each passage connects an auxiliary mount to the adapter aperture.

Additional aspects, advantages, features and objects of the present disclosure would be made apparent from the drawings and the detailed description of the illustrative embodiments construed in conjunction with the appended claims that follow.

DETAILED DESCRIPTION OF ILLUSTRATIVE EMBODIMENTS

The following detailed description illustrates aspects of the disclosure and its implementation. This description should not be understood as limiting the scope of the present disclosure, such limitation being solely contained in the claims appended thereto. Although the best mode of carrying out the invention has been disclosed, those in the art would recognize that other embodiments for carrying out or practicing the invention are also possible.

It should be noted from the outset that the present disclosure applies to modifications that may be applied to a wide variety of lamp fixtures on automotive vehicles. For purposes of illustration only, the present disclosure focuses on the CHMSL as an example of a widely encountered vehicle lamp fixture, for which a number of aftermarket adaptations have been developed. The example of the CHMSL is specifically not intended to be limiting, and nothing contained herein is intended to limit the application of the present disclosure to any suitable lamp fixture or device mounted on an automotive vehicle.

The present disclosure provides an auxiliary lighting adapter assembly for adding one or more auxiliary lamps to a CHMSL mounted above the rear glass of the vehicle such as a light truck. The auxiliary lighting adapter assembly disclosed and claimed here requires no aperture to be formed in the vehicle body beyond the CHMSL aperture already present. Thus, the structure set out below minimizes damages to the vehicle and maintains the integrity of the vehicle body against added penetration of water.

The following terms/phrases used in the present disclosure are defined as follows. The term "primary vehicle lamp/primary lamp" refers to a lamp/lighting system pre-existing and originally mounted onto a portion of a vehicle, before an adapter assembly is mounted onto the vehicle. Examples of such primary lamps may include, though are not limited to, the CHMSL for vehicles. The term "primary opening" refers to an opening provided within the adapter assembly to incorporate and accommodate the primary vehicle lamp. "Auxiliary openings" refer to openings provided within the adapter assembly to accommodate auxiliary lightings into the vehicle, in addition to or in conjunction with the primary vehicle lamp.

Figure 1:
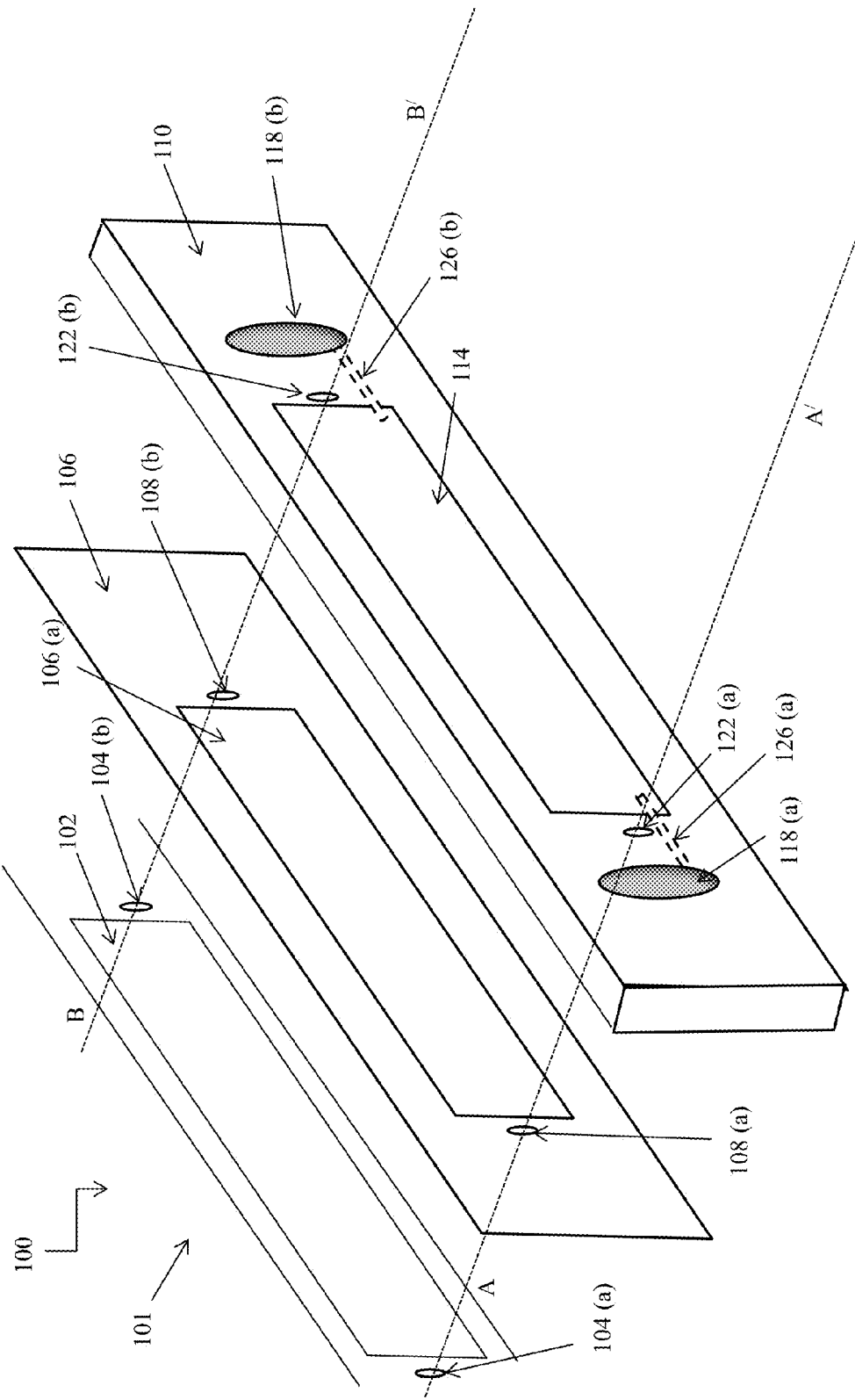
FIG. 1 is an exploded perspective view of an adapter assembly for mounting auxiliary lighting over a portion of a vehicle, according to an embodiment of the present disclosure.

FIG. 1 is an exploded perspective view of an auxiliary lighting adapter assembly 101 for mounting auxiliary lighting onto a portion of a vehicle body 100. The assembly 101 includes an adapter housing 110, dimensioned and adapted to fit over a lamp aperture 102 formed in the vehicle body 100. The lamp aperture 102 is adapted to receive and incorporate a primary lamp (not shown). It will be understood that the CHMSL is not shown in the present drawings, as it is presumed that it has been removed pending installation of the auxiliary lighting adapter assembly 101. A gasket 106 underlies the adapter housing 110, and both the gasket 106 and the adapter housing include central apertures, such as adapter aperture 114 formed in the adapter housing 110. Those apertures are dimensioned to fit over the edges of lamp aperture 102.

The adapter housing 110 is configured to receive and accommodate a primary lamp (not shown) originally mounted onto a portion of the vehicle. The adapter housing 110 may have a solid structure, formed into a substantially rectangular cross-section. At least the side of the adapter housing 110 facing the surface of vehicle 100 may be formed to fit against that surface. Specifically, Different vehicle surfaces will require different adapter housing shapes, of course, and the specific form adapter housing 110 depends on the surface profile of the vehicle body 100. Other features of adapter housing 110, such as its dimensions, may also vary, based on factors such as the size and shape of the existing primary lamp. Any suitable material can be used in manufacturing adapter housing 110 including an appropriate metal, metallic alloy, or a suitable plastic material.

The adapter housing 110 has an adapter aperture 114 for receiving and accommodating the primary lamp (not shown). Thus, adapter aperture 114 is shaped to accommodate the primary lamp. Generally, that requirement is met by dimensioning adapter aperture 114 to match a lamp aperture 102 in the vehicle body. In the illustrated embodiment, the adapter aperture 114 is rectangular in form, though, other suitable shapes for the adapter aperture 114 may also contemplated, based on the shape and the size of the primary lamp.

A lamp aperture 102 exists within a portion of the vehicle body 100, leading into the interior of the vehicle. The lamp aperture 102 is configured to substantially align with the adapter aperture 114 of the adapter housing 110, in the mounted position of the adapter assembly. When positioned within the adapter aperture 114 of the adapter housing 110, the primary vehicle lamp is configured to be partially received in the lamp aperture 102 of the vehicle. Electrical wires (not shown) pass through the lamp aperture 102, and connect the primary lamp to a power source within the vehicle. Effectively, the lamp aperture 102 is configured to facilitate positioning of the primary lamp as per the original design intent. Therefore, the size and the shape of the lamp aperture 102 within the vehicle, and the adapter aperture 114 within the adapter housing 110 of the adapter assembly, depend on the size and surface profile of the primary lamp. Hence, though depicted as rectangular in form, other shapes for the lamp aperture 102 may also be contemplated.

Auxiliary mounts 118 (*a*) and 118 (*b*) are provided on the adapter housing 110, configured to accommodate auxiliary lamps/lighting (not shown). The size and shape of each of the auxiliary mounts 118 depends on the surface profile of the auxiliary lamp it is configured to receive and accommodate. Therefore, the depicted oval shape for the auxiliary mounts 118 is merely exemplary, and other alternative shapes are possible. Depending upon the nature of the specific auxiliary lamp, each auxiliary mount 118 may be recessed into the surface of adapter housing 110, or each auxiliary mount may be simply a designated area on the surface of adapter housing 110. In some embodiments, attachment means, such as bolts, clamps, or the like, may be provided as part of each auxiliary mount 118.

As shown, the left side auxiliary mount 118 (*a*) and the right side auxiliary mount 118 (*b*) lie on either side of the adapter aperture 114. Each auxiliary mount renders provision for the incorporation of an auxiliary lamp/lightning proximate to the primary lamp accommodated within the adapter aperture 114. Specifically, a left side auxiliary lamp and a right side auxiliary lamp (not shown) can be accommodated within the auxiliary mounts 118 (*a*) and 118 (*b*), respectively. The number of such auxiliary mounts 118 provided within the adapter assembly may vary in different embodiments. Further, the positioning of auxiliary lamps could be altered so that in some embodiments, a series of lamps could extend above and below the adapter aperture 114. Other examples will be clear to those in the art.

Passages 126 (*a*) and 126 (*b*) extend from the interior of adapter aperture 114, through the adapter housing 110, to the auxiliary mounts 118 (*a*) and 118 (*b*).

Through these passages, a set of electrical connectors, such as electrical wires (not shown), connect the auxiliary lamps to a power source within the vehicle. In the illustrated embodiment, passages 126 (*a*) and 126 (*b*) open into the recessed portion of each auxiliary mount 118, allowing appropriate termination of the wires to the respective auxiliary lamps. A sealing device, gasket 106, fits between the vehicle body 100, and the adapter housing 110. Gasket aperture 106 (*a*) is dimensioned to fit around and to match lamp aperture 102 and adapter aperture 114. The gasket 106 provides a watertight seal around lamp aperture 102 when the adapter assembly 110 is mounted on the vehicle body 100. This sealing action substantially avoids intrusion of water into the cabin compartment of the vehicle. In the illustrated embodiment, the gasket 106 has a rectangular structure, and gasket aperture 106*a* matches and aligns with lamp aperture 102 and the adapter aperture 114. However, other suitable shapes for the gasket 106 are possible, based on the size and shape of the lamp aperture 102 and the adapter housing 110. Gasket 106 can be formed from any suitable conventional gasket material. Any of the wide variety of materials known and available to the art will serve to prevent intrusion of water around the adapter assembly.

It should be further noted that alternate means for providing a secure seal around lamp aperture 102 may be provided. For example, a suitable gel material may be applied to the interface between vehicle body 100 and adapter housing 110, obviating the need for a gasket itself. Those in the art will recognize, however, that gasket 106 provides an effective, inexpensive, and long-lasting solution to the problem of water intrusion.

To fix and attach the adapter housing 110 to the vehicle 100, a set of through holes are provided beside the lamp aperture 102 (holes 104 (*a*) and 104 (*b*)), gasket aperture 106 (*a*) (holes 108 (*a*) and 108 (*b*)), and adapter aperture 114 (holes 122 (*a*) and 122 (*b*)). These three sets of through holes align along longitudinal axes AA/ and BB/. Appropriate mechanical fasteners may pass through these holes, suitably provided with appropriate nuts and the like, to attach the adapter housing 110 to the vehicle body 100, with gasket 106 in between. Other suitable means for attaching the gasket 106 and the adapter housing 110 to the vehicle may be employed in other embodiments, as will be apparent to those in the art. If a permanent attachment were to be desired, techniques such as soldering or welding could be employed to provide a secure attachment.

It should be noted that after adapter housing 110 is mounted on the vehicle body 100, the primary lamp can be mounted in the same manner as originally done, by inserting that lamp through the adapter aperture 114 and into lamp aperture 102. Once that is accomplished, the primary lamp can be mounted by screws or other suitable attachment means, as may be provided in specific instances.

Figure 2:
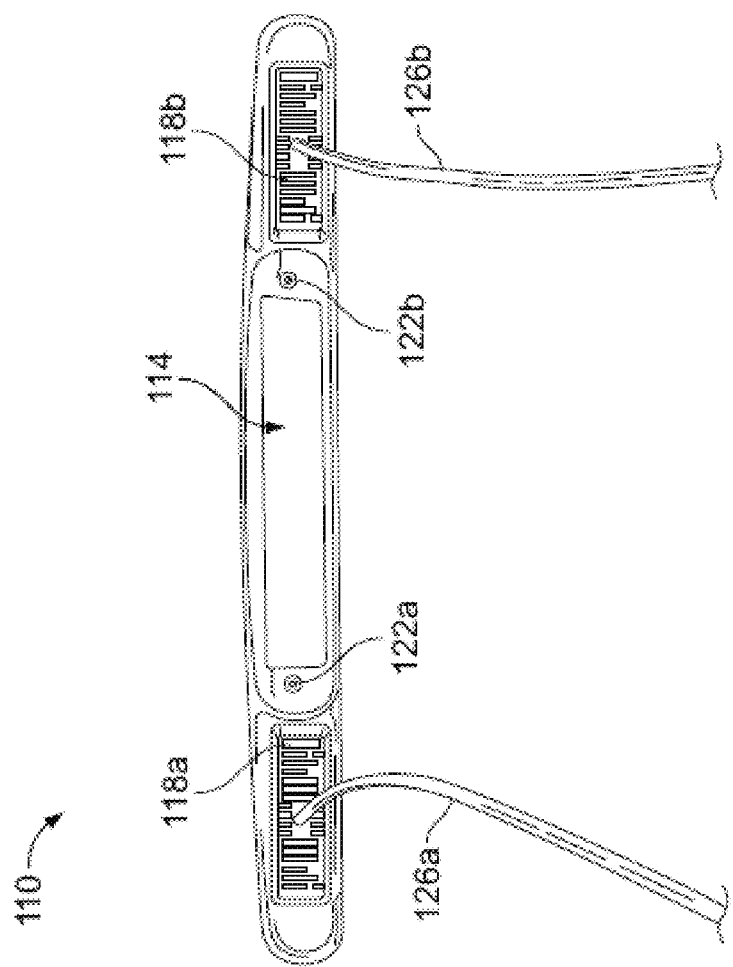
FIG. 2 is a perspective view of an adapter assembly of FIG. 1, for mounting auxiliary lighting over a portion of a vehicle, according to an embodiment of the present disclosure.

FIG. 2 is a perspective view of an exemplary adapter housing 110 (i.e., the adapter), forming an integral component of the assembly of FIG. 1. The adapter aperture 114 is configured to receive the primary lamp (not shown), to facilitate positioning of the primary lamp within the aperture provided on a portion of the vehicle. The auxiliary mounts 118 (a) and 118 (b), provided on either side of the adapter aperture 114, are configured to accommodate auxiliary lighting/lamps (not shown). The electrical wires 226 (a) and 226 (b) are configured to couple the auxiliary lighting/lamps to a power source, such as the vehicle's electrical system. As mentioned earlier, coupled to the auxiliary lamps at one end, the electrical wires 226 (a) and 226 (b) are routed through passages provided within the adapter housing 110, into the adapter aperture 114, in the assembled configuration of the adapter assembly.

As seen, the adapter aperture 114 has a substantially rectangular cross-section, though other suitable shapes may also be contemplated, based on the surface profile of the primary lamp it is configured to receive and accommodate. Also, the size of the adapter housing 110 and its adapter aperture 114 may vary in different embodiments, based on the shape and size of the primary lamp configured to be mounted and positioned therein.

Figure 3:
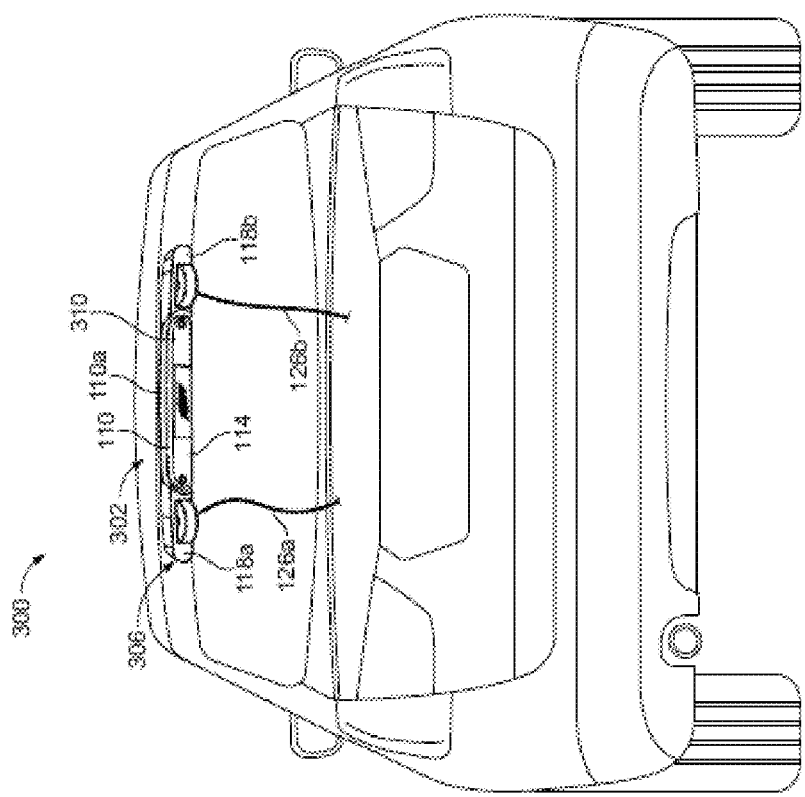
FIG. 3 is a view of a rear portion of a vehicle, with the adapter assembly of FIG. 1 mounted thereon, according to an embodiment of the present disclosure.

FIG. 3 is a view of the rear portion of a vehicle 300, with an assembly for mounting auxiliary lightning/lamp(s) over a portion of the vehicle, also illustrating the primary lamp in a mounted position, according to an embodiment of the present disclosure. As shown, the assembly is mounted onto a rear top portion 306 of the vehicle 300. In the depicted embodiment, the assembly incorporates and mounts auxiliary lighting proximate to a center high mount stop lamp (CHMSL) 310. The rear mounting surface 110 (a) of the adapter housing 110 has a surface profile designed to facilitate its positioning over the portion 306 of the vehicle. As shown, mechanical fasteners are used to mount the adapter housing 110 over the lamp aperture 102, though other means of attachment may also be contemplated. Further, a gasket (not visible), acting as a sealing device, as mentioned earlier, lies between the adapter housing 110 and the lamp aperture 102.

Auxiliary lights 130 (a) and 130 (b) are accommodated within the auxiliary mounts 118 (a) and 118 (b). The electrical wires 226 (a) and 226 (b) connect the auxiliary lights 130 (a) and 130 (b) to a power source within the vehicle. Those of skill in the art can select suitable paths for routing the electrical wires 226 (a) and 226 (b) through the interior of the cabin compartment of the vehicle. In one embodiment, such a path may run through the D-Pillar or the C-pillar of the vehicle, downwards, under the floor, and eventually channeling towards the power source.

The auxiliary lighting adapter assembly of the present disclosure, for mounting auxiliary lamps over a vehicle, can be used for any kind of vehicle, including a passenger car, pickup truck, SUV, etc. Further, the disclosed size, shape and material of the auxiliary lighting adapter assembly and its integral components are merely exemplary, and are not intended to limit the scope of the present disclosure. Therefore, variations in the depicted size, shape and material of the different components of the assembly, may also be contemplated by those skilled in the art, in certain embodiments.

As is apparent, the assembly of the present disclosure substantially avoids the need of drilling any holes into the sheet metal surface of a vehicle, and thus, significantly minimizes any damages to the vehicle, during the process of mounting. Further, the assembly can be easily disassembled and removed from the vehicle, whenever intended, for example, in a case where the vehicle is to be sold.

Although the current invention has been described comprehensively, in considerable details to cover the possible aspects and embodiments, those skilled in the art would recognize that other versions of the invention are also possible.

What is claimed is:

1. An auxiliary lighting adapter assembly for mounting one or more auxiliary lamps adjacent a primary lamp on a vehicle body, the vehicle body having a lamp aperture formed therein for receiving the primary lamp, the assembly comprising:
  an adapter housing mounted on the vehicle body, including:
    an adapter aperture, sized and positioned to align with the lamp aperture;
    one or more auxiliary mounts, each adapted to receive an auxiliary lamp; and
    one or more electrical connectors, each extending through the adapter aperture to an auxiliary mount, each connector being in electrical contact with a power source and an auxiliary lamp; and
  a sealing device positioned between the adapter housing and the vehicle body, surrounding the lamp aperture and the adapter aperture.

2. The adapter assembly of claim 1, wherein the sealing device is a gasket.

3. The adapter assembly of claim 1, wherein the adapter housing has a mounting surface with a surface profile matching the surface profile of a portion of the vehicle body adjacent to the lamp aperture.

4. The adapter assembly of claim 1, wherein the adapter housing has a first set of through-holes substantially aligning with a second set of through holes provided within the sealing device, and aligning with a third set of through holes provided within the vehicle body, adjacent to the lamp aperture, the first, the second and the third set of through holes being configured to receive mechanical fasteners for attaching the adapter assembly to the vehicle.

5. The adapter assembly of claim 1, wherein the lamp aperture and the primary lamp having a generally rectangular shape.

6. The adapter assembly of claim 1, wherein the auxiliary mounts are recessed into a surface of the adapter housing.

7. The adapter assembly of claim 6, the adapter housing further including one or more passages, each passage connecting one auxiliary mount to the adapter aperture, each passage routing an electrical connector from one auxiliary mount to the power source within the vehicle.

8. The adapter assembly of claim 1, wherein the adapter aperture extends through the entire cross-section of the adapter housing and communicates with the lamp aperture, in a mounted position of the adapter assembly.

9. An auxiliary lightning adapter housing for mounting one or more auxiliary lamps adjacent to a primary lamp mounted onto a lamp aperture provided within a portion of a vehicle, comprising:
- an adapter aperture, sized and positioned to align and communicate with the lamp aperture;
- one or more auxiliary mounts, each adapted to receive and accommodate an auxiliary lamp; and
- one or more passages, each passage connecting an auxiliary mount to the adapter aperture.

10. The adapter housing of claim 9, wherein a sealing device is positioned between the adapter housing and the portion of the vehicle, completely surrounding the lamp aperture and the adapter aperture.

11. The adapter housing of claim 10, wherein the sealing device is a gasket.

12. The adapter housing of claim 9, further comprising one or more electrical connectors, each extending through one of the passages, from an auxiliary mount to the adapter aperture, and being configured to electrically couple an auxiliary lamp accommodated within the auxiliary mount to a power source of the vehicle.

13. The adapter housing of claim 9, and having a mounting surface with a surface profile matching the surface profile of a portion of the vehicle adjacent to the lamp aperture.

14. The adapter housing of claim 9, wherein the adapter aperture with a shape dependent on the surface profile of the primary lamp.

15. The adapter housing of claim 9, wherein the auxiliary mounts are recessed into a surface of the adapter.

16. The adapter housing of claim 9, wherein the adapter aperture extends through the entire cross-section of the adapter housing and communicates with the lamp aperture, in a mounted position of the assembly.

\* \* \* \* \*